United States Patent
Satapati

(10) Patent No.: US 7,529,852 B2
(45) Date of Patent: May 5, 2009

(54) METHOD AND APPARATUS FOR HANDLING IPV4 DNS PTR QUERIES ACROSS IPV4 AND IPV6 NETWORKS

(75) Inventor: Suresh Satapati, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 813 days.

(21) Appl. No.: 10/848,344

(22) Filed: May 17, 2004

(65) Prior Publication Data

US 2005/0267978 A1    Dec. 1, 2005

(51) Int. Cl.
G06F 15/16 (2006.01)
(52) U.S. Cl. .................................. 709/245; 709/246
(58) Field of Classification Search ............... 709/230, 709/245, 246
See application file for complete search history.

(56) References Cited

U.S. PATENT DOCUMENTS

| | | | |
|---|---|---|---|
| 2004/0093434 A1* | 5/2004 | Hovell et al. | 709/249 |
| 2004/0107287 A1* | 6/2004 | Ananda et al. | 709/230 |
| 2004/0133692 A1* | 7/2004 | Blanchet et al. | 709/230 |
| 2004/0162909 A1* | 8/2004 | Choe et al. | 709/230 |
| 2004/0233916 A1* | 11/2004 | Takeuchi et al. | 370/395.54 |
| 2005/0015507 A1* | 1/2005 | Chin | 709/230 |

OTHER PUBLICATIONS

Tsirtsis, et al. "Network Address Translation-Protocol Translation (NAT-PT)," Copyright The Internet Society (2000). RFC: 2766. pp. 1-20.

M. Crawford, et al., "DNS Extensions to Support IPv6 Address Aggregation and Renumbering," Copyright The Internet Society (2000). RFC 2874. PP. 1-19.

R. Bush, "Delegation of IP6.ARPA," Copyright The Internet Society (2001). RFC 3152. pp. 1-4.

P. Srisuresh, et al. "IP Network Address Translator (NAT) Terminology and Considerations," Copyright The Internet Society (1999). RFC 2663. pp. 1-29.

International Search Report and Written Opinion dated Nov. 5, 2007 from corresponding PCT Application No. PT/US2005/17238, 9 pages (CISCP375WO).

* cited by examiner

*Primary Examiner*—John Follansbee
*Assistant Examiner*—Ranodhi N Serrao
(74) *Attorney, Agent, or Firm*—Weaver Austin Villeneuve & Sampson LLP

(57) ABSTRACT

Disclosed are methods and apparatus for efficiently and reliably handling DNS (domain name service) PTR (pointer) queries and replies across IPv4 and IPv6 networks. In general terms, an IPv4 DNS PTR query which is sent by an IPv4 device to an IPv6 DNS Server is intercepted or received, for example, by a network device configured with NAT-PT and DNS-ALG. The received IPv4 DNS PTR query is then translated into two different types of IPv6 DNS PTR queries: a query having an "IP6.INT" string and a query having an "IP6.ARPA" string. Both types of IPv6 queries are then sent to the IPv6 destination DNS Server. Whether the DNS sends an IP6.ARPA or an IP6.INT type reply or both types of replies back, a valid reply is identified (if present) and then translated before reaching the IPv4 device.

34 Claims, 5 Drawing Sheets

METHOD AND APPARATUS FOR HANDLING IPV4 DNS PTR QUERIES ACROSS IPV4 AND IPV6 NETWORKS

BACKGROUND OF THE INVENTION

The present invention relates to methods and apparatus for processing data within a computer network. More specifically, it relates to mechanisms for handling DNS (domain name system) PTR (pointer) queries and replies across IPv4 and IPv6 Networks.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP addresses is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate IP address that are used outside of the local network. When a local computer attempts to communicate with a computer outside the local network, the intermediary device matches the local computer's local IP address (and port) to one of the intermediary device's assigned IP addresses (and ports). The intermediary device then replaces the local computer's local address (and port) with the matched assigned IP address (and port). This matched assigned IP address (and port) is then used to communicate between the local computer and the outside computer. Thus, NAT techniques allow IP address to be duplicated across local networks.

Another solution to the lack of available IP addresses is to redesign the address format to allow for more possible IP addresses. The recent introduction of IPv6 provides 128 bits for the IP address, as compared with IPv4 which provides 32 bits for the IP address. However, until all network devices and computers are converted to IPv6, it is still necessary to allow an existing IPv4 device to communicate with an IPv6 device. One popular method that allows IPv4 to IPv6 communication is referred to as protocol translation (NAT-PT). The IP addresses are converted by NAT-PT from one protocol to another protocol (e.g., IPv4 to IPv6 or vice versa) or, more generally, from an external protocol to an internal protocol. In addition to the IP addresses, the NAT-PT also converts any relevant IPv4 or IPv6 information during a protocol translation.

In addition to IP addresses, a packet may also contain address(es), as well as other protocol specific fields, embedded in the payload that require translation. Particular applications may embed address(es) in the payload for various application specific purposes. The current approach for supporting applications which embed IP addresses in the payload in a NAT environment is to add application-specific knowledge (referred to as an application level gateway or ALG) within the NAT device itself. This approach is described in detail in the Internet Engineering Task Force's Request for Comments document RFC 2663, entitled IP "Network Address Translator (NAT) Terminology and Considerations" by P. Srisuresh and M. Holdrege of Lucent Technologies (August 1999), which document is incorporated herein by reference in its entirety.

Domain Name Server applications are examples of applications which use protocol information embedded within DNS type packets. DNS packets will typically include IP addresses and other fields which correspond to either an IPv4 or IPv6 protocol and such DNS packets must be translated before reaching a network having a different protocol. Before a client may communicate with a server, the client performs a DNS (domain name server) query to a DNS device to obtain an IP address of the particular server with which the client wishes to communicate. Name to address mappings are maintained by each DNS server. For instance, IP version 4 name to address mappings are held in "A" records, while IP version 6 name to address mappings are held in "AAAA" records.

Once the IP address of the particular server is obtained by the client from the DNS device, the client can then attempt to communicate with the particular server using the obtained IP address for such server. The client is configured with its own IP address, which it uses to identify itself to the server when communicating with such server.

When a client attempts to communicate with a particular server or server application, some applications are configured to check the validity of the client's reverse mapping before proceeding with interacting with the client. For instance, some telnet applications, after the TCP connection is established and before displaying a "login: prompt:", check whether the remote client's IP address corresponds to the hostname which the telnet application has used to establish a connection.

When a reverse mapping query is made from a device in a IPv4 network to an IPv6 DNS Server, the query is typically handled by a device that implements NAT-PT which operates to translate the query's IP header from an IPv4 format into an IPv6 format. The query is also handled by a DNS-ALG of the same device which operates to translate the embedded addresses from an IPv4 to an IPv6 format.

RFC2766 states that for translation of IPV4 PTR queries: (i) the string "IN-ADDR.APRA" must be replaced with "IP6.INT" and (ii) the V4 address octets (in reverse order) preceding the string "IN-ADDR.ARPA" must be replaced with the corresponding V6 address octets (if there exists a map) in reverse order. However, the RFC3152 has made the usage of "IP6.INT" obsolete and reflects the IETF consensus that IP6.ARPA domain be used for address to DNS name mapping for the IPv6 address space.

Unfortunately, the migration of DNS servers from an IP6.INT to an IP6.ARPA reverse domain is a gradual process. During this transition, some IPv6 DNS servers that have completely phased out IP6.INT may still be receiving IP6.INT formatted DNS PTR queries, while other IPv6 DNS servers which have not transitioned to IP6.ARPA may be receiving IP6.ARPA formatted DNS PTR queries. A discrepancy between the type of reverse query and configuration of the DNS server will result in a "no answer" reply or sometimes no reply from the DNS server. Thus, in these cases, the client's IP address will fail to be validated by the server and communication fails to be established between the client and server.

In view of the above, there is a need for improved mechanisms for more efficiently and reliably processing DNS PTR queries and replies across IPv4 and IPv6 networks. Additionally, there is a need for reliable handling of queries to IPv6

DNS Servers which have been configured with either or both IP6.ARPA and IP6.INT formats.

SUMMARY OF THE INVENTION

Accordingly, the present invention provides methods and apparatus for efficiently and reliably handling DNS (domain name service) PTR (pointer) queries and replies across IPv4 and IPv6 networks. In general terms, an IPv4 DNS PTR query which is sent by an IPv4 device to an IPv6 DNS Server is intercepted or received, for example, by a network device configured with NAT-PT and DNS-ALG. The received IPv4 DNS PTR query is then translated into two different types of IPv6 DNS PTR queries: a query having an "IP6.INT" string and a query having an "IP6.ARPA" string. Both types of IPv6 queries are then sent to the IPv6 destination DNS Server. Whether the DNS sends an IP6.ARPA or an IP6.INT type reply or both types of replies back, a valid reply is identified (if present) and then translated before reaching the IPv4 device.

For example, if both a "no answer" "IP6.INT" type reply and a "IP6.ARPA" type reply, which contains one or more answer records, are sent from the DNS Server to the IPv4 device, the IP6.ARPA answer reply is intercepted and translated from an IPv6 to an IPv4 protocol before reaching the IPv4 device, while the IP6.INT "no answer" reply is dropped before reaching the IPv4 device. Likewise, if both a "no answer" "IP6.ARPA" type reply and an answer "IP6.INT" type reply are sent from the DNS Server to the IPv4 device, the IP6.INT answer reply is intercepted and translated before reaching the IPv4 device, while the IP6.ARPA "no answer" reply is dropped before reaching the IPv4 device. In contrast, if two "no answers" are sent from the DNS Server to the IPv4 device, either one of the answers is forwarded to the IPv4 after it is translated from an IPv6 to an IPv4 protocol, while the other "no answer" reply is dropped.

In one embodiment, a method for handling domain name system (DNS) pointer (PTR) packets is disclosed. An IPv4 DNS PTR query that is being sent from an IPv4 device to an IPv6 DNS Server is first received in operation (a). The IPv4 query is translated into an IPv6 query having an IP6.INT string, wherein the IP-ADDR.ARPA string in the IPv4 query is replaced with an IP6.INT string to form the IPv6 query having an IP6.INT string and the translated IPv6 query having the IP6.INT string is then forwarded to the IPV6 DNS Server in operation (b). The IPv4 query is also translated into an IPv6 query having an IP6.ARPA string, wherein the IP-ADDR.ARPA string in the IPv4 query is replaced with an IP6.ARPA string to form the IPv6 query having an IP6.ARPA string and the translated IPv6 query having the IP6.ARPA string is then forwarded to the IPv6 DNS Server in operation (c). An IPv4 reply is generated based on a reply or non-reply from the IPv6 Server in response to either the IPv6 query having the IP6.ARPA string or the IPv6 query having the IP6.INT string in operation (d). This generated IPv4 reply is then sent to the IPv4 device in operation (e).

In a specific implementation, the operation of generating the IPv4 reply includes the following steps: (i) when a valid IPv6 reply is received from the IPv6 DNS Server in response to either the IPv6 query having the IP6.ARPA string or the IPv6 query having the IP6.INT string, the valid IPv6 reply is translated into a valid IPv4 reply and any other replies received in response to either the IPv6 query having the IP6.ARPA string or the IPv6 query having the IP6.INT string are dropped, and (ii) when a valid IPv6 reply is not received from the IPv6 DNS Server in response to either the IPv6 query having the IP6.ARPA string or the IPv6 query having the IP6.INT string but at least one "no answer" IPv6 reply is received from the IPv6 DNS Server in response to either the IPv6 query having the IP6.ARPA string or the IPv6 query having the IP6.INT string, a one of the received "no answer" IPv6 replies is translated into a "no answer" IPv4 reply.

In a further embodiment, a timer is set to a predefined value after the IPv4 query has been received, e.g., and translated to IP6.INT and IP6.ARPA queries that are forwarded to the IPv6 DNS Server. In a specific aspect, the value of the timer is set low enough so that the IPv4 device does not time out and high enough so as to capture any valid replies in response to either the IPv6 query having the IP6.ARPA string or the IPv6 query having the IP6.INT string.

In a further implementation, the operations of translating the valid IPv6 reply or a one of the "no answer" replies are only performed if the timer has not expired. In another aspect, the "no answer" IPv6 reply having the IP6.ARPA string is translated into an IPv4 reply having the IP-ADDR.ARPA string and the "no answer" IPv6 reply having an IP6.INT is dropped when the following conditions are met: (i) a valid IPv6 reply is not received from the IPv6 DNS Server in response to either the IPv6 query having the IP6.ARPA string or the IPv6 query having the IP6.INT string, (ii) a "no answer" IPv6 reply having an IP6.INT string and a "no answer" IPv6 reply having an IP6.ARPA string are received from the IPv6 DNS Server in response to the IPv6 query having the IP6.ARPA string and the IPv6 query having the IP6.INT string and (iii) the timer has not expired.

In another implementation, the "no answer" IPv6 reply having the IP6.INT string is translated into an IPv4 reply having the IP-ADDR.ARPA string when the following conditions are met: when (i) a valid IPv6 reply is not received from the IPv6 DNS Server in response to either the IPv6 query having the IP6.ARPA string or the IPv6 query having the IP6.INT string, (ii) a "no answer" IPv6 reply having an IP6.INT string is only received from the IPv6 DNS Server in response to the IPv6 query having the IP6.INT string and (iii) the timer has not expired.

In another aspect, the "no answer" IPv6 reply having an IP6.ARPA is translated into an IPv4 reply having the IP-ADDR.ARPA string when the following conditions are met: (i) a valid IPv6 reply is not received from the IPv6 DNS Server in response to either the IPv6 query having the IP6.ARPA string or the IPv6 query having the IP6.INT string, (ii) a "no answer" IPv6 reply having an IP6.ARPA is only received from the IPv6 DNS Server in response to the IPv6 query having the IP6.ARPA and (iii) the timer has not expired.

In yet another aspect, a reply is received in response to either the IPv6 query having the IP6.ARPA string or the IPv6 query having the IP6.INT string. The received reply is defined as a valid reply when the received reply contains one or more answer records, and defined as a "no answer" reply when the received reply fails to contain one or more answer records.

In a specific implementation, generating the IPv4 reply includes the following operations: (i) when a valid IPv6 reply having an IP6.ARPA string is received in response to either the IPv6 query having the IP6.ARPA string or the IPv6 query having the IP6.INT string before the timer has expired, the IPv4 reply is generated by translating the valid IPv6 reply having the IP6.ARPA string into the IPv4 reply, (ii) when the timer has expired and a valid IPv6 reply having the IP6.ARPA string is not received and a valid IPv6 reply having an IP6.INT string is received before expiration of the timer, the IPv4 reply is generated by translating the valid IPv6 reply having the IP6.INT string into the IPv4 reply; (iii) when a "no answer" IPv6 reply having an IP6.ARPA string is received in response to the IPv6 query having the IP6.ARPA string before expiration of the timer and a valid IPv6 reply having an IP6.INT string has not been received in response to the IPv6 query having the IP6.INT string, the IPv4 reply is generated by translating the "no answer" IPv6 reply having the IP6.ARPA string into the IPv4 reply, and (iv) when a "no answer" IPv6 reply having an IP6.INT string is received in response to the IPv6 query having the IP6.INT before expiration of the timer and a valid or a "no answer" IPv6 reply having an IP6.ARPA string has not been received in response to the IPv6 query having the IP6.ARPA string, the IPv4 reply is generated by translating the "no answer" IPv6 reply having the IP6.INT string into the IPv4 reply.

In an alternative aspect, information is stored regarding the reply from the DNS Server, wherein the stored information indicates whether the DNS Server is configured to use an IP6.INT or an IP6.ARPA string. Only operations (a) and (c) through (e) are repeated for a next received IPv4 DNS PTR query that is being sent to the DNS Server when the information stored for the DNS Server indicates that the DNS Server is configured to use the IP6.ARPA string. In contrast, only operations (a) and (b) and (d) through (e) are repeated for a next received IPv4 DNS PTR query that is being sent to the DNS Server when the information stored for the DNS Server indicates that the DNS Server is configured to use only the IP6.INT string.

In another embodiment, the invention pertains to a computer system operable to handle domain name system (DNS) pointer (PTR) packets. The computer system includes one or more processors and one or more memory. At least one of the memory and processors are adapted to provide at least some of the above described method operations. In yet a further embodiment, the invention pertains to a computer program product for handling domain name system (DNS) pointer (PTR) packets. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Figure 1:
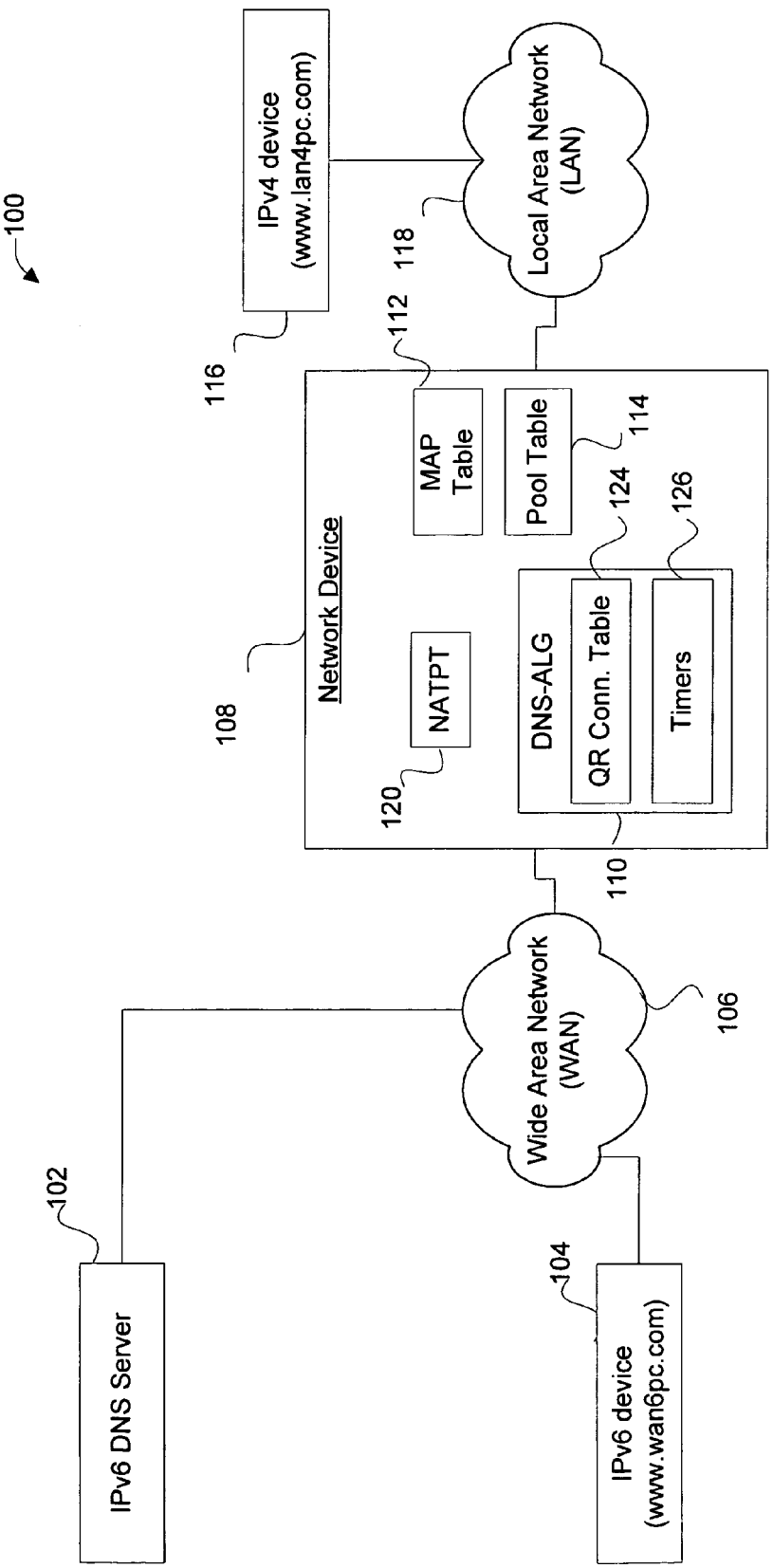
FIG. 1 is a diagrammatic representation of a network in which techniques of the present invention may be implemented in accordance with one embodiment of the present invention.

FIG. 1 is a diagrammatic representation of a network 100 in which techniques of the present invention may be implemented in accordance with one embodiment of the present invention. As shown, the network 100 includes a plurality of devices interconnected via a wide area network (WAN) 106, such as the Internet. Some of the devices may implement IPv6, IPv4, or both IPv6 and IPv4. For example, device 104 and DNS Server 102 implement IPv6, while device 116 implements IPv4.

Each device may also be coupled to the WAN 106 through a local area network (LAN) or one or more network devices. In the illustrated example, IPv4 device 116 is coupled via LAN 118 and network device 108 to WAN 106. In this embodiment, the network device is configured to implement NAT-PT 120 and DNS-ALG 110. In general, the network device 108 uses NAT-PT to translate between the IPv4 and IPv6 protocols and DNS-ALG to translate protocol information embedded in the payload of DNS type packets or data.

Throughout this document, we assume that the DNS-ALG functionality is implemented in the same device that is implementing NAT-PT. However, this invention is not restricted to this setting in any manner, and it covers the other scenario where DNS-ALG need not be hosted by the same device that is hosting NAT-PT functionality, which will be appreciated by those skilled in the art. Additionally, the NAT-PT and DNS-ALG functionalities may be integrated together into a single software process or divided between any number of software processes.

Additionally, WAN 106 or LAN 118 may include any number and type of network elements, routers, NAT or NAT-PT devices, DNS-ALG devices, clients, servers, and devices. Additionally, a single IPv4/IPv6 DNS server may be utilized to handle both IPv4 and IPv6 requests. Each DNS server may also be located anywhere else within the network 100, such as within network device 108, coupled directly with network device 108, or within LAN network 118. There may be any suitable number of DNS servers within WAN 106 and/or LAN network 118. There may be any suitable number and type of NAT-PT and/or DNS-ALG devices within WAN network 106 and/or LAN network 118.

The NAT-PT 120 and DNS-ALG 110 may utilize any suitable number and type of data structures for facilitating their operations as described herein. In one embodiment, the DNS-ALG 110 includes a query-response (QR) connection table 124 (also referred herein as a connection table) for tracking DNS query and corresponding response connections and one or more timers 126 for limiting particular DNS handling actions to be performed within predefined time limits before implementing an alternative action as described further below. The NAT-PT 120 and/or DNS-ALG 110 may also share an address pool table 114 having available translation addresses for the LAN 118 and a map table 112 for tracking bindings between private and public addresses (e.g., IPv4 and IPv6 addresses).

In general terms, the present invention provides mechanism for handling an IPv4 DNS PTR query and its resulting IPv6 reply. In the illustrated example of FIG. 1, IPv6 device 104 initially tries to communicate with IPv4 device 116. Before communicating with the IPv4 device 116, the IPv6 device 104 sends a domain name that it has for IPv4 device 116 (e.g., www.loan4pc.com) to a DNS Server to obtain the IP address of IPv4 device 116. During this DNS handshaking between the IPv6 client 104 and the DNS Server, the network device 108 obtains a binding between an IPv6 IP address and an IPv4 address used for IPv4 device 116. The IPv6 IP address is generally assigned from the network device 220's address pool table 114. The IPv6 device 116 can then communicate with IPv4 device 116 by using the IP address obtained for IPv4 device 116.

The IPv6 uses a particular IP address to identify itself when communicating with IPv4 device 116. The IPv4 device 116 may attempt to verify the IP address of the IPv6 device 102 with IPv4 DNS Server 102. The IPv4 device 116 expects the DNS Server 102 to return a particular domain name (e.g., www.wan6pc.com) for the particular IP address of IPv6 device 104. If the DNS Server 102 returns the expected domain name, then the IPv4 device 116 determines that the IPv6 device is valid. To perform such a reverse mapping validity check, IPv4 device 116 sends a DNS PTR query through network device 108 to IPv6 DNS Server 102. The DNS Server 102 sends one or more DNS PTR replies through network device 108 to IPv4 device 116. In the present invention, the network device 108 is operable to handle DNS PTR queries and replies for a IPv6 DNS Server that is configured to use either or both "IP6.INT" and "IP6.ARPA" strings.

Figure 2:
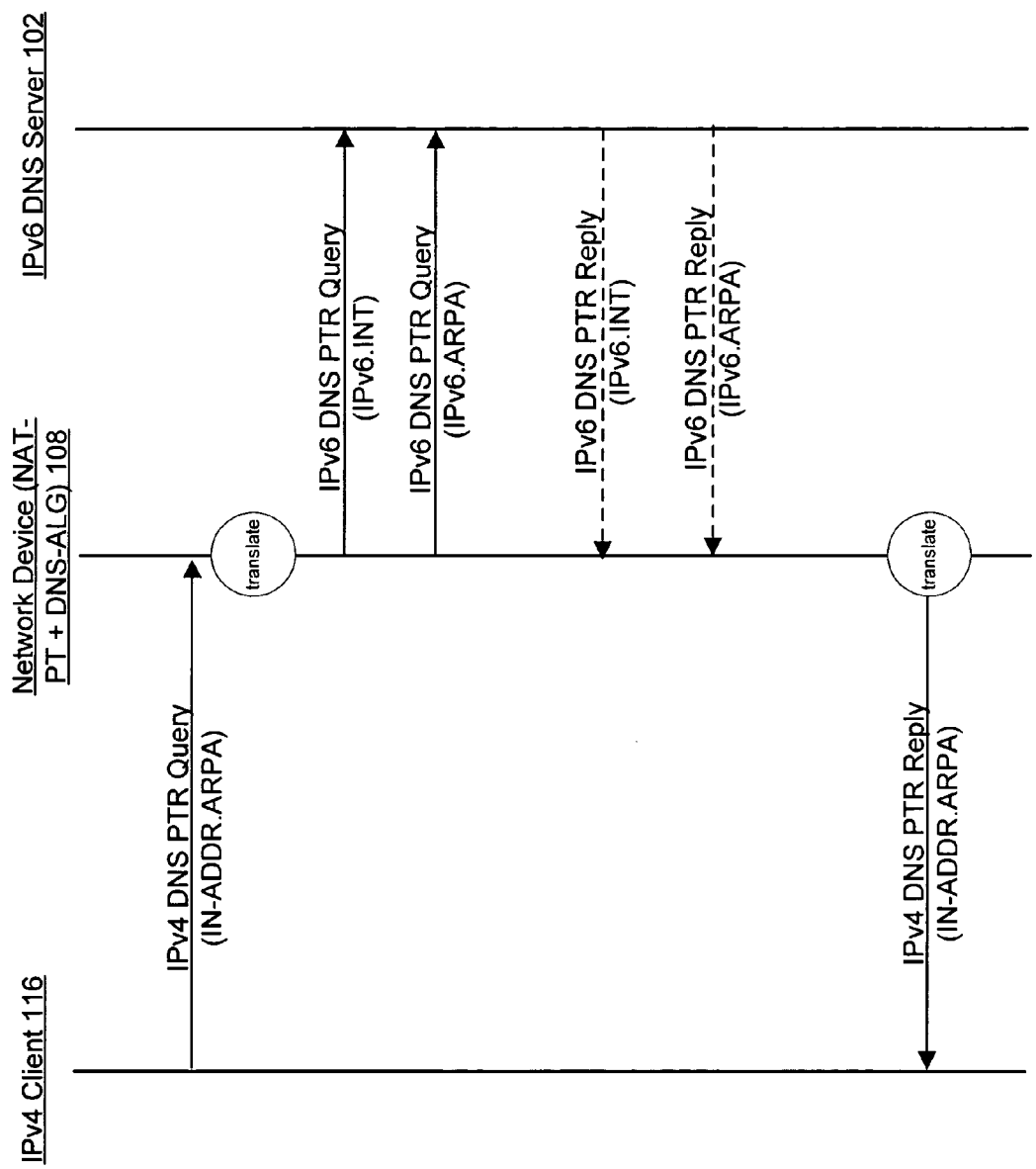
FIG. 2 is a communication diagram in which an IPv4 device sends a DNS PTR query to an IPv6 DNS Server in accordance with one embodiment of the present invention.
Figure 3:
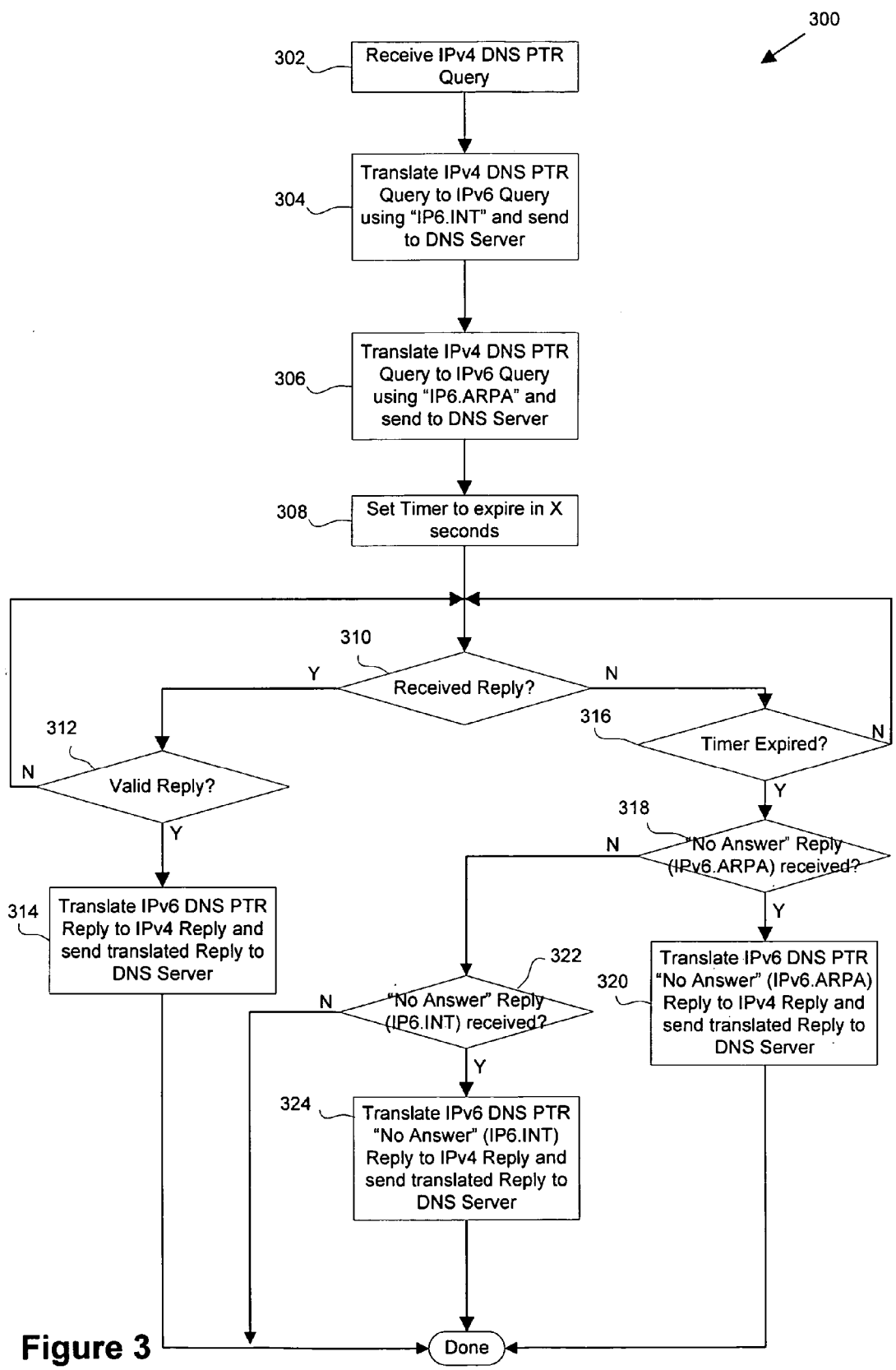
FIG. 3 is a flowchart illustrating a procedure for handling a DNS PTR query and reply in accordance with a specific embodiment of the present invention.

FIG. 2 is a communication diagram in which IPv4 device sends a DNS PTR query for validating the reverse mapping of an address of an IPv6 device in accordance with one embodiment of the present invention. FIG. 3 is a flowchart illustrating a procedure for handling a DNS PTR query and reply in accordance with a specific embodiment of the present invention, and such FIG. 3 is described herein in conjunction with FIG. 2. Initially, an IPv4 DNS PTR query is received in operation 302. For example, network device 108 receives an IPv4 DNS PTR query from IPv4 device 116 being sent to IPv6 DNS Server 102.

The received IPv4 DNS PTR query is translated to an IPv6 query using the string "IP6.INT" and this translated query is then sent to DNS server in operation 304. Additionally, the received IPv4 DNS PTR query is translated to an IPv6 query using the string "IP6.ARPA" and sent to the DNS server in operation 306. Of course, these translations are only performed if the queries are destined for an IPv6 type DNS Server. A translation is generally required if a binding exists for the destination device in the MAP table (e.g., 112) used by the network device (e.g., 108).

Figure 4:
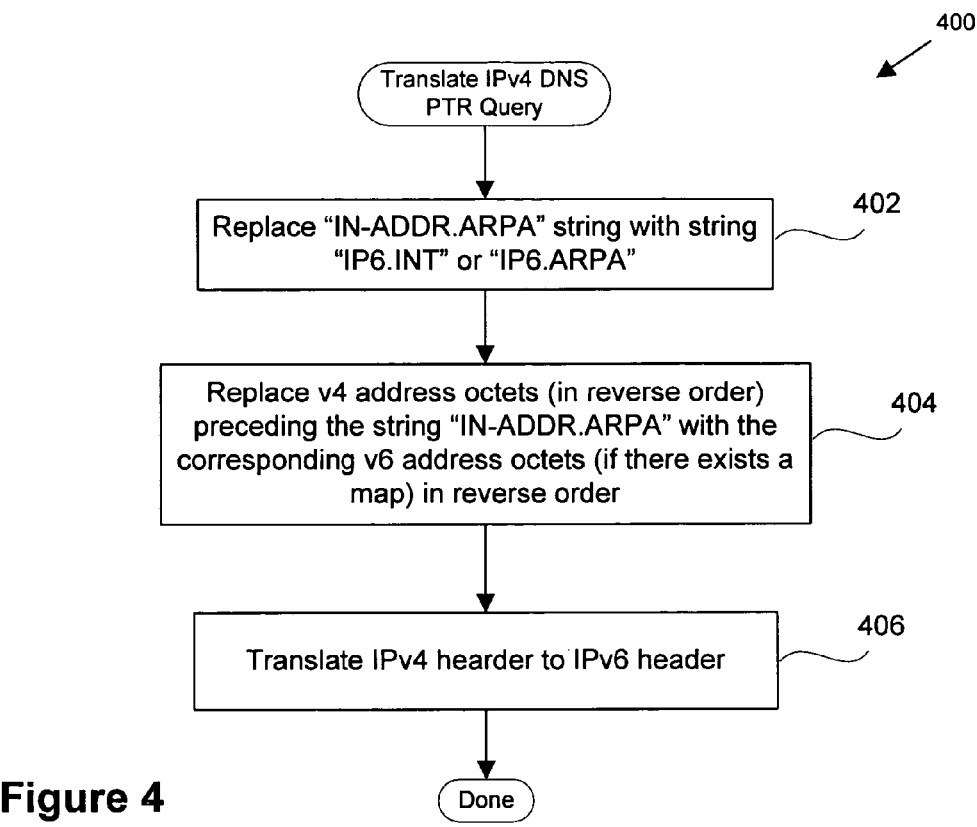
FIG. 4 is a flowchart illustrating a procedure for translating an IPv4 DNS PTR query in accordance with one embodiment of the present invention.

FIG. 4 is a flowchart illustrating a procedure for translating an IPv4 DNS PTR query in accordance with one embodiment of the present invention. These operations may be performed in any suitable order. In the illustrated embodiment, the "IN-ADDR.ARPA" string of the query is replaced by the "IP6.INT" (or "IP6.ARPA") string in operation 402. It is noted that two translations are performed for the two different types of IPv6 strings. The IPv4 address octets of the query, which are in reverse order and precede the string, are replaced with the corresponding IPv6 address octets (e.g., from the MAP table 112) in reverse order in operation 404. Additionally, the IPv4 header is translated to an IPv6 header. For example, the destination IP address is converted from an IPv4 address (32 bit address) to an IPv6 address (128 bit address) by appending a prefix to the destination address. The same type of IPv4 to IPv6 conversion is performed on the source address. The query class (QCLASS) is also changed from IPv4 to IPv6. Other protocol dependent fields are also changed as described in the above referenced RFC 2766 document.

Referring back to FIG. 3, after the two IPv6 queries are forwarded towards their DNS destination (see FIG. 2), a timer is then set to expire in x seconds in operation 308. Any suitable x number of seconds may be used. Preferably, the timer is set to a low enough value so that the originator of the query does not time out and high enough to capture any valid replies from the DNS server. For example, 30 seconds may be used. After the timer is set, it is then determined whether a DNS PTR reply has been received in operation 310. If a reply has been received, it is then determined whether the reply is valid in operation 312. In one embodiment, the DNS PTR reply is defined as valid when it contains one or more answer records. One way to determine whether there are one are more answer records, besides inspecting the answer record content, is to inspect the record count field which specifies the number of records present. If the reply contains "no answer," it is defined as invalid. When the reply is valid, this IPv6 DNS PTR reply is translated to an IPv4 DNS PTR reply in operation 314. Any later received IPv6 DNS PTR replies that correspond to this particular query are dropped. The procedure then ends.

Figure 5:
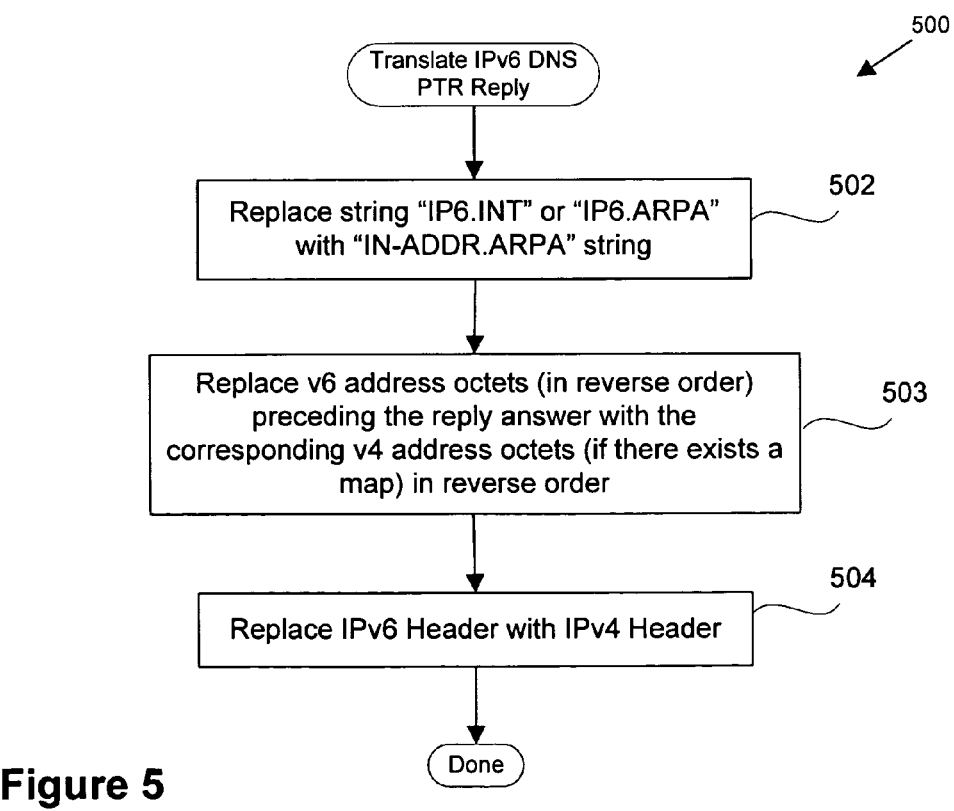
FIG. 5 is a flowchart illustrating a procedure for translating an IPv6 DNS PTR reply in accordance with one embodiment of the present invention.

The following translation procedure may be performed for a DNS PTR reply having either a "IP6.INT" or "IP6.ARPA" string. FIG. 5 is a flowchart illustrating a procedure for translating an IPv6 DNS PTR reply in accordance with one embodiment of the present invention. The operations may be performed in any suitable order. In this example, the 'IP6.INT" or "IP6.ARPA" string is replaced with the "IP-ADDR.ARPA" string in operation 502. The v6 address octets (in reverse order) preceding the reply answer record(s) are also replaced with the corresponding v4 address octets (if there exists a map) in reverse order in operation 503. The IPv6 header is also replaced or converted into an IPv4 header in operation 504. For example, the destination IP address is converted from an IPv6 address (128 bit address) to an IPv4 address (32 bit address) by stripping a prefix from the destination address. The same type of IPv6 to IPv4 conversion is performed on the source address. The query class (QCLASS) is also changed from IPv6 to IPv4, as well as performing any other protocol conversions as described in the above referenced RFC 2766 document.

Referring back to FIG. 3, if the received IPv6 DNS PTR reply is not valid, the procedure then again determines whether a reply has been received in operation 310. If a reply is received, the procedure then would perform operations 312 (and possibly 314) as described above.

If a DNS PTR reply has not been received, it is then determined whether the timer has expired in operation 316. If the timer has not expired, then it is again determined whether a reply has been received in operation 310. Procedure 300 waits for a reply to be received until the timer expires.

When the timer expires, it is then determined whether a "no answer" reply having an IPv6.ARPA format has been received in operation 318. If such a reply has been received, this IPv6 DNS PTR "no answer" reply is translated to an IPv4 reply and this translated reply is sent to the DNS server in operation 320. If another "no answer" reply having the IP6.INT string had been also received, it is dropped.

If an IPv6.ARPA formatted reply has not been received, it is then determined whether a "no answer" reply having an IPv6.INT format has been received in operation 322. If such a reply has been received, this IPv6 DNS PTR reply is translated to an IPv4 reply and sent to the DNS server in operation 324. The procedure then ends. If no "no answer" replies have been received, nothing is done and the procedure simply ends.

In general, if two "no answer" replies are received in response to the same query, either reply may be translated and forwarded to the querying device, while the other reply is dropped.

In an alternative embodiment, when a valid reply having an IP6.INT string is the first reply received, the network device may wait for a second valid reply having an IP6.ARPA string. If the timer expires before receiving a second valid reply, the first valid reply having the IP6.INT string is sent. Any later received replies for this same query are dropped. However, if a second valid reply having an IP6.ARPA string is received before expiration of the timer, this second reply is translated and sent to the querying device, while the first reply is dropped.

In a further implementation, information regarding the DNS Server may be stored during the procedure for handling a set of DNS PTR queries and replies, for example, by the network device 108. This information may specify whether the DNS Server is configured to use IP6.INT or IP6.ARPA strings. This information may then be later used, e.g., by the network device 108, to reduce the number of procedure operations for handling a DNS PTR query and reply. For instance, if the information for a particular DNS Server indicates that such DNS Server only utilizes the IP6.ARPA string, an operation for forming a query with an IP6.INT string may be skipped. Also, if a "no answer" reply having the IP6.ARPA string is received, it is simply translated and sent to the querying device without waiting for a second valid reply. Likewise, if the information for a particular DNS Server indicates that such DNS Server only utilizes the IP6.INT string, an operation for forming a query with an IP6.ARPA string may be skipped. Also, if a "no answer" reply having the IP6.INT string is received, it is simply translated and sent to the querying device without waiting for a second valid reply.

Generally, the techniques for handling DNS PTR queries and replies (as well as for translating addresses and protocols) of the present invention may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT-PT and DNS-ALG device) may be implemented on a general-purpose network host machine such as a personal computer or workstation. Further, the invention may be at least partially implemented on a card (e.g., an interface card) for a network device or a general-purpose computing device.

Figure 6:
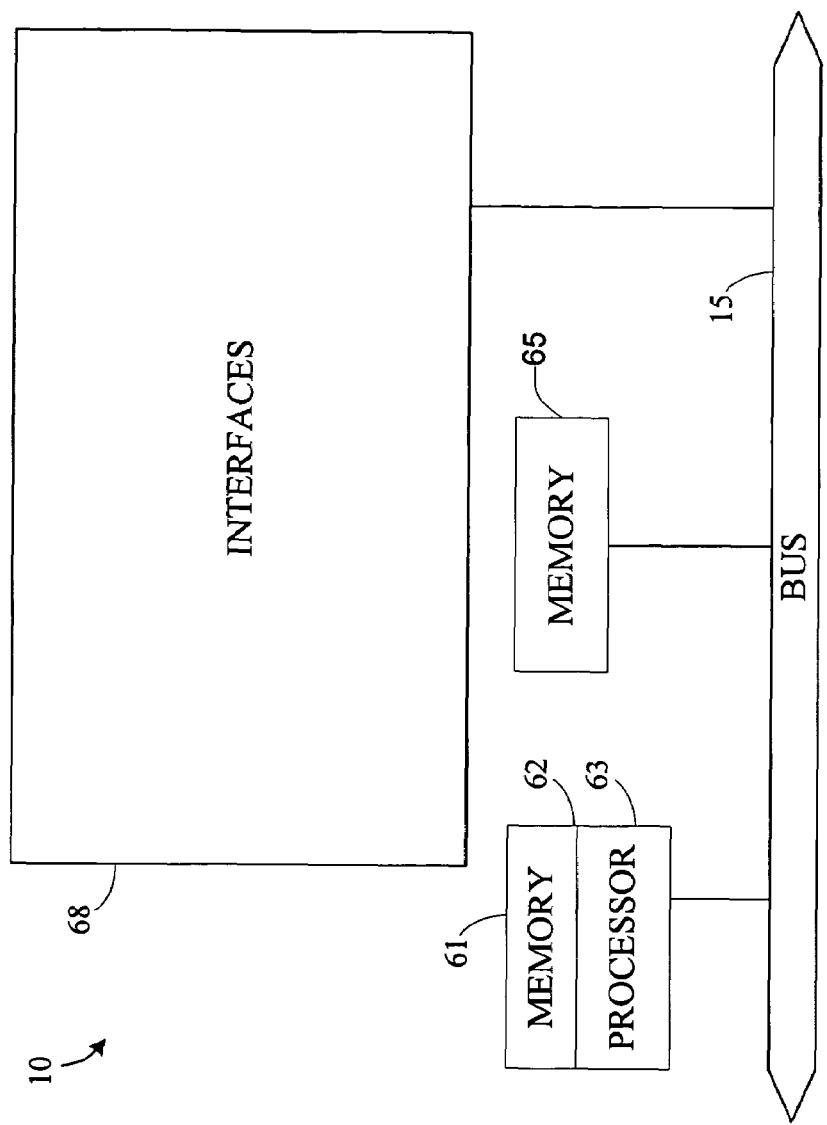
FIG. 6 is a diagrammatic representation of a router in which embodiments of the present invention may be implemented.

Referring now to FIG. 6, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing protocol conversions between a first and second protocol (e.g., IPv4 and IPv6), determining whether to forward or hold a DNS reply, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, state information regarding the DNS Server, a MAP table, a pool table, connection tables, etc.

Because such information and program instructions may be employed to Implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM).

Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method for handling domain name system (DNS) pointer (PTR) packets, comprising:
    (a) receiving an IPv4 DNS PTR query that is being sent from an IPv4 device to an IPv6 DNS Server;
    (b) translating the IPv4 query into a first IPv6 query having an IP6.INT string, wherein an IP-ADDR.ARPA string in the IPv4 query is replaced with the IP6.INT string to form the first Ipv6 query having the IP6.INT string, and forwarding the translated first Ipv6 query having the IP6.INT string to the IPV6DNS Server;
    (c) translating the Ipv4 query into a second IPv6 query having an IP6.ARPA string, wherein the IP-ADDR.ARPA string in the IPv4 query is replaced with the IP6.ARPA string to form the second IPv6 query having the IP6.ARPA string, and forwarding the translated second Ipv6 query having the IP6.ARPA string to the IPv6 DNS Server;
    (d) generating an Ipv4 reply based on a valid reply or "no answer" reply from the IPv6 Server in response to either the second Ipv6 query having the IP6.ARPA string or the first Ipv6 query having the IP6.INT string, wherein the valid reply contains one or more answer records and the "no answer" reply does not contain one or more answer records; and
    (e) sending the generated IPv4 reply to the Ipv4 device.

2. A method as recited in claim 1, wherein the operation of generating the Ipv4 reply comprises:
    when a valid Ipv6 reply is received from the IPv6 DNS Server in response to either the second IPv6 query having the IP6.ARPA string or the first Ipv6 query having the IP6.INT string, translating the valid IPv6 reply into a valid IPv4 reply and dropping any other replies received in response to either the second Ipv6 query having the IP6.ARPA string or the first Ipv6 query having the IP6.INT string; and
    when a valid IPv6 reply is not received from the IPv6 DNS Server in response to either the second IPv6 query having the IP6.ARPA string or the first Ipv6 query having the IP6.INT string but at least one "no answer" Ipv6 reply is received from the IPv6 DNS Server in response to either the second IPv6 query having the IP6.ARPA string or the first Ipv6 query having the IP6.INT string, translating one of the received "no answer" Ipv6 replies into a "no answer" IPv4 reply.

3. A method as recited in claim 2, further comprising:
    setting a timer to a predefined value after the IPv4 query has been received,
    wherein the operations of translating the valid IPv6 reply or one of the "no answer"replies are only performed if the timer has not expired.

4. A method as recited in claim 3, wherein when (i) a valid Ipv6 reply is not received from the Ipv6 DNS Server in response to either the second IPv6 query having the IP6.ARPA string or the first Ipv6 query having the IP6.INT string, (ii) a "no answer" Ipv6 reply having an IP6.INT string and a "no answer" IPv6 reply having an IP6.ARPA string are received from the IPv6 DNS Server in response to the second Ipv6 query having the IP6.ARPA string and the first Ipv6 query having the IP6.INT string and (iii) the timer has not expired, translating the "no answer" IPv6 reply having the IP6.ARPA string into an Ipv4 reply having the IP-ADDR.ARPA string and dropping the "no answer" IPv6 reply having an IP6.INT.

5. A method as recited in claim 4, wherein when (i) a valid IPv6 reply is not received from the IPv6 DNS Server in response to either the second IPv6 query having the IP6.ARPA string or the first IPv6 query having the IP6.INT string, (ii) a "no answer" IPv6 reply having an IP6.INT string is only received from the IPv6 DNS Server in response to the first IPv6 query having the IP6.INT string and (iii) the timer has not expired, translating the "no answer" IPv6 reply having the IP6.INT string into an IPv4 reply having the IP-ADDR.ARPA string.

6. A method as recited in claim 5, wherein when (i) a valid IPv6 reply is not received from the IPv6 DNS Server in response to either the second Ipv6 query having the IP6.ARPA string or the first IPv6 query having the IP6.INT string, (ii) a "no answer" Ipv6 reply having an IP6.ARPA is only received from the Ipv6 DNS Server in response to the second IPv6 query having the IP6.ARPA and (iii) the timer has not expired, translating the "no answer" Ipv6 reply having an IP6.ARPA into an Ipv4 reply having the IP-ADDR.ARPA string.

7. A method as recited in claim 3, wherein the value of the timer is set low enough so that the Ipv4 device does not time out and high enough so as to capture any valid replies in response to either the second IPv6 query having the IP6.ARPA string or the first IPv6 query having the IP6.INT string.

8. A method as recited in claim 3, further comprising:
    receiving a reply in response to either the second IPv6 query having the IP6.ARPA string or the first Ipv6 query having the IP6.INT string;
    defining the received reply as a valid reply when the received reply contains one or more answer records; and
    defining the received reply as a "no answer" reply when the received reply fails to contain one or more answer records.

9. A method as recited in claim 3, wherein generating the IPv4 reply comprises:
    when a valid IPv6 reply having an IP6.ARPA string is received in response to either the second IPv6 query having the IP6.ARPA string or the first Ipv6 query having the IP6.INT string before the timer has expired, generating the IPv4 reply by translating the valid Ipv6 reply having the IP6.ARPA string into the Ipv4 reply;

when the timer has expired and a valid IPv6 reply having the IP6.ARPA string is not received and a valid Ipv6 reply having an IP6.INT string is received before expiration of the timer, generating the IPv4 reply by translating the valid Ipv6 reply having the IP6.INT string into the IPv4 reply;

when a "no answer" IPv6 reply having an IP6.ARPA string is received in response to the second IPv6 query having the IP6.ARPA string before expiration of the timer and a valid IPv6 reply having an IP6.INT string has not been received in response to the first IPv6 query having the IP6.INT string, generating the IPv4 reply by translating the "no answer" IPv6 reply having the IP6.ARPA string into the Ipv4 reply; and when a "no answer" IPv6 reply having an IP6.INT string is received in response to the first IPv6 query having the IP6.before expiration of the timer and a valid or a "no answer" IPv6 reply having an IP6.ARPA string has not been received in response to the second IPv6 query having the IP6.ARPA string, generating the IPv4 reply by translating the "no answer" IPv6 reply having the IP6.INT string into the IPv4 reply.

10. A method as recited in claim 1, further comprising:

storing information regarding the reply from the DNS Server, wherein the stored information indicates whether the DNS Server is configured to use an IP6.INT or an IP6.ARPA string;

repeating only operations (a) and (c) through (e) for a next received IPv4 DNS PTR query that is being sent to the DNS Server when the information stored for the DNS Server indicates that the DNS Server is configured to use the IP6.ARPA string; and repeating only operations (a) through (b) and (d) through (e) for a next received IPv4 DNS PTR query that is being sent to the DNS Server when the information stored for the DNS Server indicates that the DNS Server is configured to use only the IP6.INT string.

11. The method as recited in claim 1, wherein the steps of (b) translating the IPv4 query into a first IPv6 query having an IP6.INT string and forwarding the translated first IPv6 query having the IP6.INT string to the IPv6 DNS Server are performed without waiting for a reply from the IPv6 DNS Server in response to the translated second IPv6 query; and wherein the steps of (c) translating the IPv4 query into a second IPv6 query having an IP6.ARPA string and forwarding the translated second IPv6 query having the IP6.ARPA string to the IPv6 DNS Server are performed without waiting for a reply from the IPv6 DNS Server in response to the translated first IPv6 query.

12. The method as recited in claim 1, wherein the step of forwarding the translated first IPv6 query having the IP6.INT string to the IPv6 DNS Server is performed before receiving a reply from the IPv6 DNS Server in response to the translated second IPv6 query; and wherein the step of forwarding the translated second IPv6 query having the IP6. ARPA string to the IPv6 DNS Server is performed before receiving a reply from the IPv6 DNS Server in response to the translated first IPv6 query.

13. The method as recited in claim 1, wherein generating an IPv4 reply is performed based upon a "no-answer" reply from the IPv6 Server in response to either the second IPv6 query having the IP6.ARPA string or the first IPv6 query having the IP6.string if a valid reply has not been received in response to either the second IPv6 query having the IP6.ARPA string or the first IPv6 query having the IP6.INT string.

14. The method as recited in claim 1, further comprising:

determining whether a valid reply has been received in response to either the second IPv6 query having the IP6.ARPA string or the first IPv6 query having the IP6.INT string;

wherein generating an IPv4 reply is performed based upon a "no-answer" reply from the IPv6 Server in response to either the second IPv6 query having the IP6.ARPA string or the first IPv6 query having the IP6.INT string if it has been determined that a valid reply has not been received in response to either the second IPv6 query having the IP6.ARPA string or the first IPv6 query having the IP6.INT string.

15. A computer system operable to handle domain name system (DNS) pointer (PTR) packets, the computer system comprising:

one or more processors;

one or more memory, wherein at least one of the processors and memory are adapted for:

(a) receiving an IPv4 DNS PTR query that is being sent from an IPv4 device to an IPv6 DNS Server;

(b) translating the IPv4 query into a first IPv6 query having an IP6.INT string, wherein an IP-ADDR.ARPA string in the IPv4 query is replaced with the IP6.INT string to form the first IPv6 query having the IP6.INT string, and forwarding the translated first IPv6 query having the IP6.INT string to the IPV6 DNS Server;

(c) translating the IPv4 query into a second IPv6 query having an IP6.ARPA string, wherein the IP-ADDR.ARPA string in the IPv4 query is replaced with the IP6.ARPA string to form the second IPv6 query having the IP6.ARPA string, and forwarding the translated second IPv6 query having the IP6.ARPA string to the IPv6 DNS Server;

(d) generating an IPv4 reply based on a valid reply or "no answer" from the IPv6 Server in response to either the second IPv6 query having the IP6.ARPA string or the first IPv6 query having the IP6.INT string, wherein the valid reply contains one or more answer records and the "no answer reply" does not contain one or more answer records; and (e) sending the generated IPv4 reply to the IPv4 device.

16. A computer system as recited in claim 15, wherein the operation of generating the IPv4 reply comprises:

when a valid IPv6 reply is received from the IPv6 DNS Server in response to either the second IPv6 query having the IP6.ARPA string or the first IPv6 query having the IP6.INT string, translating the valid IPv6 reply into a valid IPv4 reply and dropping any other replies received in response to either the second IPv6 query having the IP6.ARPA string or the first IPv6 query having the IP6.INT string; and when a valid IPv6 reply is not received from the IPv6 DNS Server in response to either the second IPv6 query having the IP6.ARPA string or the first IPv6 query having the IP6.INT string but at least one "no answer" IPv6 reply is received from the IPv6 DNS Server in response to either the second IPv6 query having the IP6.ARPA string or the first IPv6 query having the IP6.INT string, translating one of the received "no answer" IPv6 replies into a "no answer" IPv4 reply.

17. A computer system as recited in claim 16, wherein at least one of the processors and memory are further adapted for:

setting a timer to a predefined value after the IPv4 query has been received, wherein the operations of translating the valid IPv6 reply or a one of the "no answer" replies are only performed if the timer has not expired.

18. A computer system as recited in claim 17, wherein when (i) a valid IPv6 reply is not received from the IPv6 DNS Server in response to either the second IPv6 query having the IP6.ARPA string or the first IPv6 query having the IP6.INT string, (ii) a "no answer" IPv6 reply having an IP6.INT string and a "no answer" IPv6 reply having an IP6.ARPA string are received from the IPv6 DNS Server in response to the second IPv6 query having the IP6.ARPA string and the first IPv6 query having the IP6.INT string and (iii) the timer has not expired, translating the "no answer" IPv6 reply having the IP6.ARPA string into an IPv4 reply having the IP-ADDR.ARPA string and dropping the "no answer" IPv6 reply having an IP6..

19. A computer system as recited in claim 18, wherein when (i) a valid IPv6 reply is not received from the IPv6 DNS Server in response to either the second IPv6 query having the IP6.ARPA string or the first IPv6 query having the IP6.INT string, (ii) a "no answer" IPv6 reply having an IP6.INT string is only received from the IPv6 DNS Server in response to the first IPv6 query having the IP6.INT string and (iii) the timer has not expired, translating the "no answer" IPv6 reply having the IP6.INT string into an IPv4 reply having the IP-ADDR.ARPA string.

20. A computer system as recited in claim 19, wherein when (i) a valid IPv6 reply is not received from the IPv6 DNS Server in response to either the second IPv6 query having the IP6.ARPA string or the first IPv6 query having the IP6.INT string, (ii) a "no answer" IPv6 reply having an IP6.ARPA is only received from the IPv6 DNS Server in response to the second IPv6 query having the IP6.ARPA and (iii) the timer has not expired, translating the "no answer" IPv6 reply having an IP6.ARPA into an IPv4 reply having the IP-ADDR.ARPA string.

21. A computer system as recited in claim 17, wherein the value of the timer is set low enough so that the IPv4 device does not time out and high enough so as to capture any valid replies in response to either the second IPv6 query having the IP6.ARPA string or the first IPv6 query having the IP6.INT string.

22. A computer system as recited in claim 15, wherein at least one of the processors and memory are further adapted for:

storing information regarding the reply from the DNS Server, wherein the stored information indicates whether the DNS Server is configured to use an IP6. or an IP6.ARPA string;

repeating only operations (a) and (c) through (e) for a next received IPv4 DNS PTR query that is being sent to the DNS Server when the information stored for the DNS Server indicates that the DNS Server is configured to use the IP6.ARPA string; and repeating only operations (a) through (b) and (d) through (e) for a next received IPv4 DNS PTR query that is being sent to the DNS Server when the information stored for the DNS Server indicates that the DNS Server is configured to use only the IP6.INT string.

23. A computer program product for handling domain name system (DNS) pointer (PTR) packets, the computer program product comprising:

at least one computer readable medium;

computer program instructions stored within the at least one computer readable product configured for:

(a) receiving an IPv4 DNS PTR query that is being sent from an IPv4 device to an IPv6 DNS Server;

(b) translating the IPv4 query into a first IPv6 query having an IP6.INT string, wherein an IP-ADDR.ARPA string in the IPv4 query is replaced with the IP6.INT string to form the first IPv6 query having the IP6.INT string, and forwarding the translated first IPv6 query having the IP6.INT string to the IPV6 DNS Server;

(c) translating the IPv4 query into a second IPv6 query having an IP6.ARPA string, wherein the IP-ADDR.ARPA string in the IPv4 query is replaced with the IP6.ARPA string to form the second IPv6 query having the IP6.ARPA string, and forwarding the translated second IPv6 query having the IP6.ARPA string to the IPv6 DNS Server;

(d) generating an IPv4 reply based on a valid reply or "no answer" reply from the IPv6 Server in response to either the second IPv6 query having the IP6.ARPA string or the first IPv6 query having the IP6.INT string, wherein the valid reply contains one or more answer records and the "no answer" reply does not contain one or more answer records; and (e) sending the generated IPv4 reply to the IPv4 device.

24. A computer program product as recited in claim 23, wherein the operation of generating the IPv4 reply comprises:

when a valid IPv6 reply is received from the IPv6 DNS Server in response to either the second IPv6 query having the IP6.ARPA string or the first IPv6 query having the IP6.INT string, translating the valid IPv6 reply into a valid IPv4 reply and dropping any other replies received in response to either the second IPv6 query having the IP6.ARPA string or the first IPv6 query having the IP6.INT string; and when a valid IPv6 reply is not received from the IPv6 DNS Server in response to either the second IPv6 query having the IP6.ARPA string or the first IPv6 query having the IP6.INT string but at least one "no answer" IPv6 reply is received from the IPv6 DNS Server in response to either the second IPv6 query having the IP6.ARPA string or the first IPv6 query having the IP6.INT string, translating one of the received "no answer" IPv6 replies into a "no answer" IPv4 reply.

25. A computer program product as recited in claim 24, the computer program instructions stored within the at least one computer readable product being further configured for:

setting a timer to a predefined value after the IPv4 query has been received, wherein the operations of translating the valid IPv6 reply or a one of the "no answer" replies are only performed if the timer has not expired.

26. A computer program product as recited in claim 25, wherein when (i) a valid IPv6 reply is not received from the IPv6 DNS Server in response to either the second IPv6 query having the IP6.ARPA string or the first IPv6 query having the IP6.INT string, (ii) a "no answer" IPv6 reply having an IP6.INT string and a "no answer" IPv6 reply having an IP6.ARPA string are received from the IPv6 DNS Server in response to the second IPv6 query having the IP6.ARPA string and the first IPv6 query having the IP6.INT string and (iii) the timer has not expired, translating the "no answer" IPv6 reply having the IP6.ARPA string into an IPv4 reply having the IP-ADDR.ARPA string and dropping the "no answer" IPv6 reply having an IP6..

27. A computer program product as recited in claim 26, wherein when (i) a valid IPv6 reply is not received from the IPv6 DNS Server in response to either the second IPv6 query having the IP6.ARPA string or the first IPv6 query having the IP6.INT string, (ii) a "no answer" IPv6 reply having an IP6.INT string is only received from the IPv6 DNS Server in response to the first IPv6 query having the IP6.INT string and (iii) the timer has not expired, translating the "no answer" IPv6 reply having the IP6.INT string into an IPv4 reply having the IP-ADDR.ARPA string.

28. A computer program product as recited in claim 27, wherein when (i) a valid IPv6 reply is not received from the IPv6 DNS Server in response to either the second IPv6 query having the IP6.ARPA string or the first IPv6 query having the IP6.INT string, (ii) a "no answer" IPv6 reply having an IP6.ARPA is only received from the IPv6 DNS Server in response to the second IPv6 query having the IP6.ARPA and (iii) the timer has not expired, translating the "no answer" IPv6 reply having an IP6.ARPA into an IPv4 reply having the IP-ADDR.ARPA string.

29. A computer program product as recited in claim 25, wherein the value of the timer is set low enough so that the IPv4 device does not time out and high enough so as to capture any valid replies in response to either the second IPv6 query having the IP6.ARPA string or the first IPv6 query having the IP6.INT string.

30. A computer program product as recited in claim 25, the computer program instructions stored within the at least one computer readable product being further configured for:
  receiving a reply in response to either the second IPv6 query having the IP6.ARPA string or the first IPv6 query having the IP6.INT string;
  defining the received reply as a valid reply when the received reply contains one or more answer records; and
  defining the received reply as a "no answer" reply when the received reply fails to contain one or more answer records.

31. A computer program product as recited in claim 25, wherein generating the IPv4 reply comprises:
  when a valid IPv6 reply having an IP6.ARPA string is received in response to either the second IPv6 query having the IP6.ARPA string or the first IPv6 query having the IP6.INT string before the timer has expired, generating the IPv4 reply by translating the valid IPv6 reply having the IP6.ARPA string into the IPv4 reply;
  when the timer has expired and a valid IPv6 reply having the IP6.ARPA string is not received and a valid IPv6 reply having an IP6.INT string is received before expiration of the timer, generating the IPv4 reply by translating the valid IPv6 reply having the IP6.INT string into the IPv4 reply;
  when a "no answer" IPv6 reply having an IP6.ARPA string is received in response to the second IPv6 query having the IP6.ARPA string before expiration of the timer and a valid IPv6 reply having an IP6.INT string has not been received in response to the first IPv6 query having the IP6.INT string, generating the IPv4 reply by translating the "no answer" IPv6 reply having the IP6.ARPA string into the IPv4 reply; and
  when a "no answer" IPv6 reply having an IP6.INT string is received in response to the first IPv6 query having the IP6.before expiration of the timer and a valid or a "no answer" IPv6 reply having an IP6.ARPA string has not been received in response to the second IPv6 query having the IP6.ARPA string, generating the IPv4 reply by translating the "no answer" IPv6 reply having the IP6.INT string into the IPv4 reply.

32. A computer program product as recited in claim 23, the computer program instructions stored within the at least one computer readable product being further configured for:
  storing information regarding the reply from the DNS Server, wherein the stored information indicates whether the DNS Server is configured to use an IP6.or an IP6.ARPA string;
  repeating only operations (a) and (c) through (e) for a next received IPv4 DNS PTR query that is being sent to the DNS Server when the information stored for the DNS Server indicates that the DNS Server is configured to use the IP6.ARPA string; and
  repeating only operations (a) through (b) and (d) through (e) for a next received IPv4 DNS PTR query that is being sent to the DNS Server when the information stored for the DNS Server indicates that the DNS Server is configured to use only the IP6.INT string.

33. An apparatus for handling domain name system (DNS) pointer (PTR) packets, comprising:
  means for (a) receiving an IPv4 DNS PTR query that is being sent from an IPv4 device to an IPv6 DNS Server;
  means for (b) translating the IPv4 query into a first IPv6 query having an IP6.string, wherein an IP-ADDR.ARPA string in the IPv4 query is replaced with the IP6.INT string to form the first IPv6 query having the IP6.INT string, and forwarding the translated first IPv6 query having the IP6.INT string to the IPV6 DNS Server;
  means for (c) translating the IPv4 query into a second IPv6 query having an IP6.ARPA string, wherein the IP-ADDR.ARPA string in the IPv4 query is replaced with the IP6.ARPA string to form the second IPv6 query having the IP6.ARPA string, and forwarding the translated second IPv6 query having the IP6.ARPA string to the IPv6 DNS Server;
  means for (d) generating an IPv4 reply based on a valid reply or "no answer" reply from the IPv6 Server in response to either the second IPv6 query having the IP6.ARPA string or the first IPv6 query having the IP6.INT string, wherein the valid reply contains one or more answer records and the "no answer" reply does not contain one or more answer records; and
  means for (e) sending the generated IPv4 reply to the IPv4 device.

34. An apparatus as recited in claim 33, further comprising:
  means for storing information regarding the reply from the DNS Server, wherein the stored information indicates whether the DNS Server is configured to use an IP6.or an IP6.ARPA string;
  means for repeating only operations (a) and (c) through (e) for a next received IPv4 DNS PTR query that is being sent to the DNS Server when the information stored for the DNS Server indicates that the DNS Server is configured to use the IP6.ARPA string; and
  means for repeating only operations (a) through (b) and (d) through (e) for a next received IPv4 DNS PTR query that is being sent to the DNS Server when the information stored for the DNS Server indicates that the DNS Server is configured to use only the IP6.INT string.

* * * * *